(12) United States Patent
Bowman

(10) Patent No.: US 8,584,359 B1
(45) Date of Patent: Nov. 19, 2013

(54) FLOATING RING GEAR EPICYCLIC GEAR SYSTEM

(71) Applicant: Thomas W. Bowman, East Berlin, PA (US)

(72) Inventor: Thomas W. Bowman, East Berlin, PA (US)

( * ) Notice: Subject to any disclaimer, the term of this patent is extended or adjusted under 35 U.S.C. 154(b) by 0 days.

(21) Appl. No.: 13/767,012

(22) Filed: Feb. 14, 2013

Related U.S. Application Data

(60) Provisional application No. 61/634,005, filed on Feb. 22, 2012.

(51) Int. Cl.
*B21D 53/28* (2006.01)
*F16H 48/06* (2006.01)

(52) U.S. Cl.
USPC .......................................... 29/893.1; 475/220

(58) Field of Classification Search
USPC ............. 29/893.1, 893–893.37; 475/220, 296
See application file for complete search history.

(56) References Cited

U.S. PATENT DOCUMENTS

| | | | |
|---|---|---|---|
| 3,450,218 A | 6/1969 | Looker | |
| 4,597,453 A * | 7/1986 | Kilmer et al. | 173/171 |
| 4,986,802 A | 1/1991 | Scoville et al. | |
| 5,098,355 A | 3/1992 | Long | |
| 5,409,431 A * | 4/1995 | Vranish | 475/342 |
| 5,690,577 A * | 11/1997 | Enzmann et al. | 475/265 |
| 6,017,289 A | 1/2000 | Gaffney | |
| 6,533,700 B2 * | 3/2003 | Shoge | 475/275 |
| 6,572,508 B2 * | 6/2003 | Shoge | 475/324 |
| 7,314,097 B2 * | 1/2008 | Jenner et al. | 173/48 |
| 7,794,355 B2 * | 9/2010 | Pusateri | 475/331 |
| 8,075,443 B2 | 12/2011 | Cunliffe et al. | |
| 2007/0201748 A1 * | 8/2007 | Bixler et al. | 382/225 |
| 2008/0171630 A1 | 7/2008 | Madge et al. | |
| 2008/0287247 A1 * | 11/2008 | Pusateri | 475/272 |
| 2008/0287249 A1 * | 11/2008 | Diosi et al. | 475/346 |
| 2011/0017324 A1 | 1/2011 | Emanuel et al. | |
| 2011/0036208 A1 * | 2/2011 | Yang | 81/57 |

FOREIGN PATENT DOCUMENTS

JP          62237155 A    * 10/1987

OTHER PUBLICATIONS

Prior Art DC Motor With Planetary Gear System.

* cited by examiner

*Primary Examiner* — David Bryant
*Assistant Examiner* — Jacob Cigna
(74) *Attorney, Agent, or Firm* — Roger N. Chauza, PC

(57) ABSTRACT

A small size epicyclic gear system in which the mating between gear housings is purposefully made with some play to allow a certain degree of relative movement to accommodate machining runout errors in the manufacture of the gears. A castellated cap fastened to the motor engages with a castellated gear reduction body. The tolerances built into the cap and gear reduction body allow relative radial movement therebetween to reduce binding of the gears during rotational positions in which the gear component runout tolerances are additive.

16 Claims, 3 Drawing Sheets

FLOATING RING GEAR EPICYCLIC GEAR SYSTEM

RELATED APPLICATION

This U.S. non-provisional patent application claims the benefit of U.S. provisional application Ser. No. 61/634,005, filed Feb. 22, 2012.

TECHNICAL FIELD OF THE INVENTION

The present invention relates in general to gear mechanisms, and more particularly to methods and apparatus for overcoming the adverse effects of variations in machining tolerances of the gear parts thereof.

BACKGROUND OF THE INVENTION

Planetary, or epicyclic, gear systems are well known for providing different rotational speeds between the input and the output. In epicyclic gear systems, one of the axles of the gears moves in a circular path. Depending on which part of the planetary gear system is driven with an input torque, the output can be a torque of either a higher rpm or a lower rpm. A typical epicyclic gear system includes two or more planet gears mounted to a carrier, a central sun gear that meshes with all of the planet gears, and an annular ring gear that also meshes with all of the planet gears. If the sun gear is driven with an input torque, then the output is obtained from the planet gear carrier, in which event a reduction in speed between the input and the output is achieved. The output speed is reduced, but the torque is increased. Conversely, if the input torque is applied to the planet gear carrier, the output is obtained from the central sun gear. In this case, the input speed is increased, with a corresponding reduction in output torque.

Often, one of the three components of the epicyclic gear system is maintained stationary, or fixed against rotation, and the other components are allowed to rotate. In this configuration, one of the moving components is the input and the other rotating component is the output. Many times, the ring gear is held fixed against rotational movement. The ratio of input rotation to output rotation is a function of the number of teeth in each gear, and the number of teeth of the component which is maintained stationary.

As with all types of gears, the manufacture thereof involves certain tolerances, or errors, in the various dimensions of the gear components. Machine "runout" is the error in the concentricity of a component that cannot be eliminated, but is inherent in milling machines and the like. The higher precision the machine, the less runout is involved, but the cost of the product is correspondingly increased. The diameter of the gear involves a given error that is tolerated, as does the central bore diameter, the teeth spacing, tooth thickness, root diameter, pitch, etc. In some situations, the dimensional errors in the gear components cause an interference, in that the freedom of rotation is reduced as the tolerances can be additive at certain angular positions of rotation, thereby causing the gears to momentarily bind and require additional power to move the gears past the interfering position. When the gears are large with correspondingly large teeth, the interference can be minimal as the increased meshing between the gear teeth does not cause a significant interference, and thus is generally unnoticeable. However, when the gears are constructed with small diameters and correspondingly small teeth, the interference between out-of-round gears can cause substantial interference, thus requiring additional input power. A non-uniform input power is thus required to cause the gears to rotate at a constant speed. A smooth transfer of power between the input and the output is thus more difficult. This situation is exacerbated in epicyclic gear systems where the planet gears not only rotate, but the axles of the planet gears also rotate, thus providing more opportunities for interferences between the three gear components.

Even when machining or otherwise forming gears with a high degree of accuracy, errors can be introduced into the gear system when assembled together. Often gear systems include different housing parts that house the different gear assemblies. When the gear assemblies are assembled in the respective housings, and when the housings are assembled together, such as by using bolts, there are various inaccuracies in the alignment between the housings, and thus between the subassembly of gears that must mesh together and operate as a system. The assembly errors and inaccuracies can be overcome by manufacturing the housings with a high degree of precision, but this significantly increases the overall cost of the gear system.

A need therefore exists for a technique to overcome the adverse affects of cumulative machining errors in the manufacture of planetary gear systems. Another need exists for a technique to allow one of the planetary gear components to float to reduce interference with the planetary gears. Another need exists for allowing the ring gear to float while engaged with the rotating planetary gears mounted to the carrier. Another need exists for assembling the housings of the gear assembly together without directly bolting the housings together, but by using a floating housing arrangement.

SUMMARY OF THE INVENTION

In accordance with the principles and concepts of the invention, disclosed is a technique for fabricating a gear system with small-size gears so that machining errors in the gears do not result in binding or interference between meshing gears during operation. The gears are mounted to apparatus that purposefully allows a small degree of radial movement between the meshing gears so that when the machining gear tolerances become additive between the gears, one or both gears yield in the mounting apparatus and binding between the gears is reduced or eliminated.

According to a feature of the invention, an epicyclic gear system includes gears mounted for rotation between respective housings, namely a cap and a gear reducer body. The cap and gear reducer body are fastened together using interleaved ring grooves in both the cap and the gear reducer body. A split retaining ring is captured in the ring grooves to hold the both housings together. The ring grooves in the cap and the gear reducer body are machined so that such components can move somewhat radially with respect to each other when the gears tend to bind during rotation. With this arrangement, the cap and gear reducer body components move a little radially to allow the gears to move freely without binding. The ring grooves of the components can also be made to allow the cap and gear reducer body to move axially somewhat to reduce the adverse results of other interfering gear system components. The ability to allow one housing to float somewhat with respect to the other housing also reduces the need for precision alignment between the housings. Also, bolts are not needed to fasten the two housings together.

According to a further feature of the invention, the cap and gear reducer body are fabricated with interleaved castellations, including castellated mating tabs and valleys. Each castellated tab of the cap and each castellated tab of the gear reducer body are formed with a peripheral ring groove therein, so that when the castellated tabs are interleaved together, a generally continuous single ring groove is formed. The cap is fastened to a drive motor, and a split retaining ring is inserted into the ring groove to hold the gear reducer body to the cap. The mating arrangement allows the gear reducer body to move radially a small amount with respect to the cap to thereby reduce binding between the epicyclic gears that rotate between the cap and the gear reducer body.

According to one embodiment of the invention, disclosed is a method of manufacturing an epicyclic gear system, including fabricating a two-part housing including a cap and a gear reducer body. Male and female members are formed around an annular edge of the cap, and male and female members are formed around an annular edge of the gear reducer body. The cap and the gear reducer body are formed so that the male and female members of the cap mate with the respective female and male members of the gear reducer body. A ring gear operates within the gear reducer body. Gears are arranged within the housing, and at least some of the gears mesh with the ring gear of the gear reducer body. The male and female members are formed in one of the cap or the gear reducer body so as to allow relative radial movement therebetween when the male and female members of the cap are interleaved with the female and male members of the gear reducer body to reduce binding of the gears. The gear reducer body is mounted to the cap to form an integral epicyclic gear system.

According to another embodiment of the invention, disclosed is a method of manufacturing a gear system, including using a cap and a gear reduction body to mount a gear system therein, and rigidly mounting the cap to a motor so that a shaft of the motor drives the gear system. Castellation tabs and castellation valleys are formed around the cap. Castellation tabs and castellation valleys are formed on an end of the gear reduction body, and the castellation tabs of the gear reducer body extend axially beyond the end of the gear reducer body so that the castellation tabs of the gear reducer body fit within the castellation valleys of the cap. An inner arcuate part of each castellation tab of the gear reducer body engages with an outer arcuate part of a respective castellation valley of the cap. The engagement between the inner arcuate part and the outer arcuate part occurs with a desired amount of play to allow the gear reducer body to move radially with respect to the cap and thus reduce binding between the gears of the gear system.

According to yet another embodiment of the invention, disclosed is a method of manufacturing a gear system, including using a first housing and a second housing to mount a gear system therein. An output shaft of the gear system extends from the second housing, and the first housing is rigidly mounted to a motor so that a shaft of the motor drives the gear system. The second housing is mounted to the first housing so that the second housing moves radially with respect to the first housing in an amount sufficient to remove binding of gears comprising the gear system.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
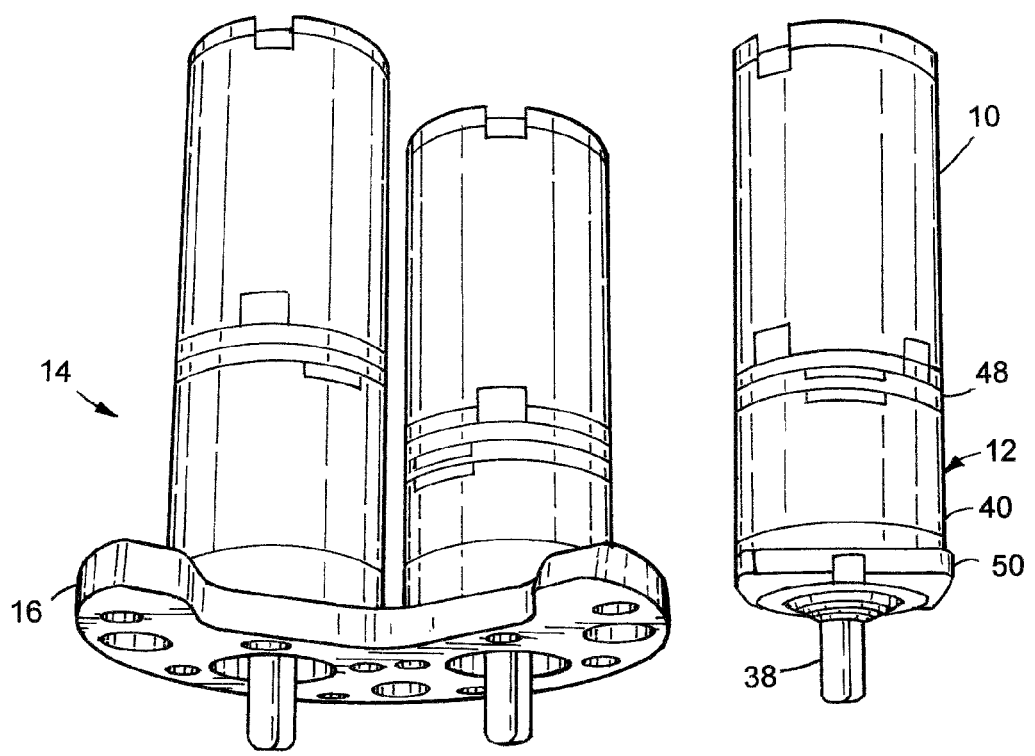
FIG. 1 is an isometric view of a motor assembly employed in a reinstatement cutting machine.

FIG. 1 illustrates a miniature DC motor, which is also shown mounted in an assembly 14 to a common mounting plate 16. In practice, the DC motors are employed in reinstatement cutters of the type that are transported in underground main pipes that have been reinstated with plastic liners. The cutting machine is equipped with a cutting bit that is remotely controlled to remove a plug of the plastic liner at a location where a lateral pipe is connected to the main pipe. The removal of the plastic area that covers the lateral opening to the main allows the waste water to flow from the lateral to the main. The cutting machine is operated with a video camera to allow the operator at the surface to not only move the reinstatement cutting machine along the main, but to also move the cutting bit in a circular path to cut and remove the plug from the plastic liner. Such types of reinstatement cutting machines are more thoroughly described in U.S. Pat. Nos. 7,249,918; 7,364,392 and 7,473,057 by Bowman. The DC motors 10 (with the epicyclic gear reduction mechanisms 12) are used to move the cutter carriage mechanism for the cutting bit in desired paths to cut through the plastic liner at the exact location where the lateral opens into the main.

Figure 2:
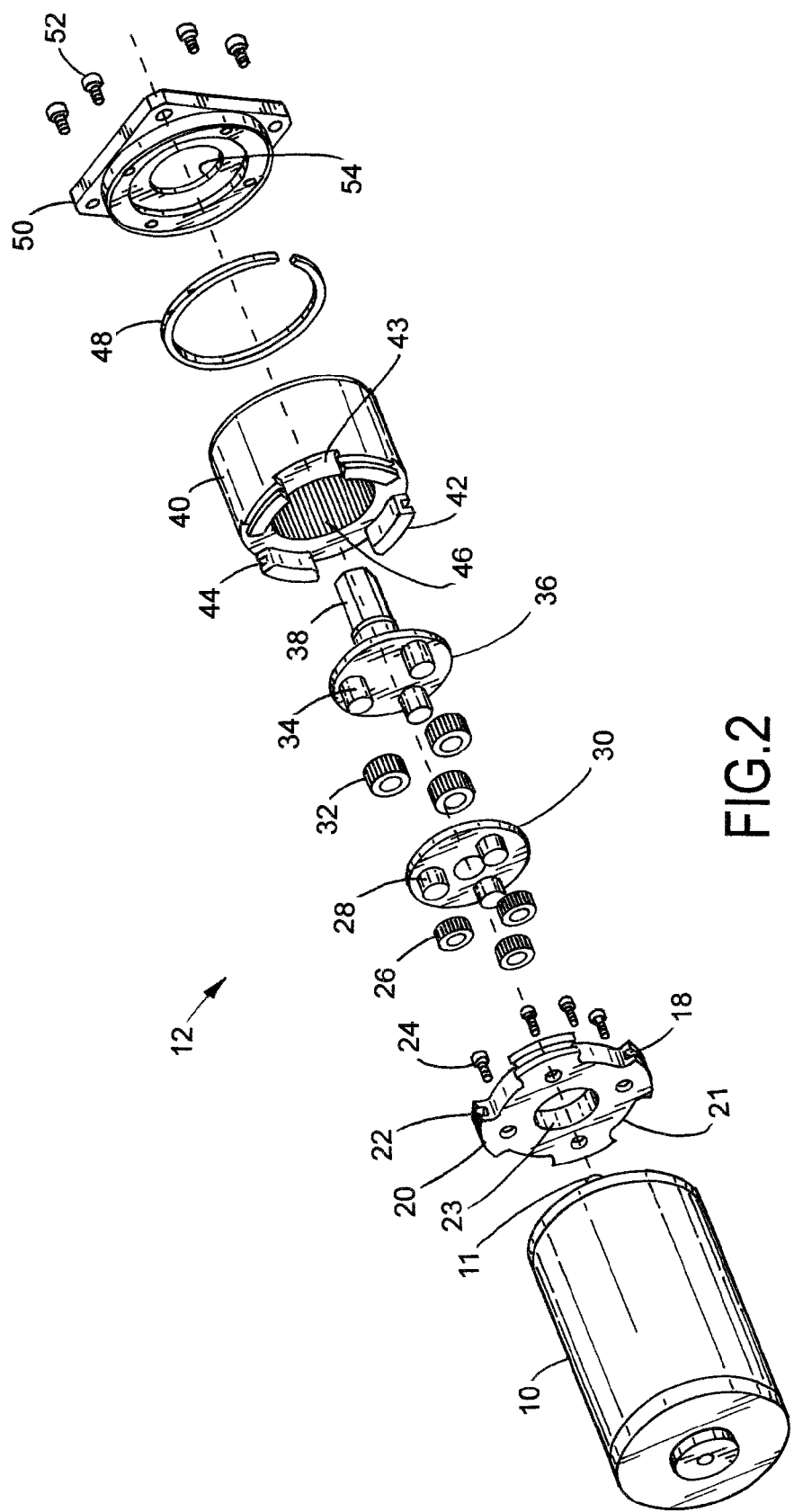
FIG. 2 is an exploded view of the various components of a DC motor employed for driving a cutting bit of the reinstatement cutting machine.

FIG. 2 is an exploded view of the components of the epicyclic gear reduction mechanism 12 and the DC motor 10. The components include a cap 18, or first housing part, with male and female engaging members in the form of castellations 20. The castellations 20 of the cap 18 are separated with valleys 21. While only four castellations 20 are illustrated, other numbers of castellations can be employed. The castellations 20 are constructed with respective ring grooves 22 on the peripheral edges thereof. As will be described in more detail below, the first and second housings 18 and 40 are fastened together by the interengaging castellations and a split retaining ring 48. No bolts are needed to fasten the housing parts 18 and 40 together, and thus the housing parts 18 and 40 are not rigidly fastened together.

The cap 18 is constructed with a central bore 23 that snugly fits over a boss (not shown) formed on the frontal end face of the motor 10. The bore 23 allows the cap 18 to be accurately registered when mounted to the motor 10. A number of screws 24 are used to fasten the cap 18 to the end face of the DC motor 10. The motor 10 is equipped with a shaft having a sun gear 11 fastened thereto. The sun gear 11 can be machined as part of the motor shaft, or separately attached thereto. The epicyclic gear system 12 employed in the preferred embodiment is a two-stage (compound) gear system to achieve the desired gear reduction ratio.

The first stage comprises three planet gears 26 that are rotatably mounted to respective journals 28 of a planet carrier 30. The sun gear 11 of the motor 10 meshes centrally with the three planet gears 26. While not shown, a second sun gear is centrally fixed to the other side of the planet carrier 30 and rotates therewith. A second stage comprises the planet gears 32 that are rotatably mounted to respective journals 34 of an output shaft assembly 36. The rear sun gear of the first planet carrier 30 meshes centrally with the three planet gears 32 of the second stage. Fixed to the output shaft assembly 36 is a hexagonal-shaped output shaft 38.

A gear reducer body 40, or second housing part, is constructed with engaging male and female members in the form of castellations 42. Each castellation 42 has a ring groove 44 formed therein. Formed internal to the gear reducer body 40 are teeth comprising a ring gear 46. The teeth of the ring gear 46 mesh with both sets of planet gears 26 and 32. When the epicyclic gear reduction system 12 is assembled together, the castellations 42 of the gear reducer body 40 mesh or interengage with the castellations 20 of the cap 18. Stated another way, when interengaged together, the castellation tabs 20 of the cap 18 fit into the respective castellation valleys 43 of the gear reducer body 40, and the castellation tabs 44 of the gear reducer body 40 fit within the respective castellation valleys 21 of the cap 18. The ring grooves 22 and 44 of the castellation tabs 20 and 42 thus align to form an single substantially continuous annular ring groove. A split retaining ring 48 is then clipped into the aligned ring grooves 22 and 44 of the castellation tabs 20 and 42 of the cap 18 and the gear reducer body 40. The relaxed retaining ring 48 thus clamps the gear reducer body 40 to the cap 18, although the gear reducer body 40 floats somewhat with respect to the cap 18. Lastly, a trans cap 50 is fastened to the to the back side of the gear reducer body 40 with screws 52. The output shaft 38 extends out of the back end of the epicyclic gear reduction system 12 through a hole 54 centrally formed in the trans cap 50. A load to be driven by the motor 10 is fastened to the hexagonal output shaft 38. The gears of the epicyclic gear system 12 are lubricated with a suitable grease.

During machining of the gears and other components, the machining runout inherent therein results in errors in the concentricity of the gears, axles, journals, and the like. Any nonuniformity in the concentricity or other irregularity in the planetary gears 26 and 32, the ring gear 46, or the sun gear 11 can momentarily interrupt the smooth roll between the gears, reduce the speed of the system, cause friction and heat, require increased motor current, and reduce the service life of the system. The errors in the concentricity of the gear components can be additive during rotation so that the gears momentarily experience a slight bind, as the meshing engagement between the gear teeth increases excessively. The errors in concentricity of the gears and the rotating components are especially critical with small size gears. Small diameter gears have correspondingly smaller gear teeth. The chances of excessive gear tooth engagement is thus more likely, given a nominal runout error during the machining process. Larger gears are able to sustain the same runout error without binding or experiencing excessive engagement. Thus, the runout error introduced into a gear during the machining of small diameter gears leads to a higher likelihood of binding, than in large diameter gears. In certain applications, such as in reinstatement cutting machines, the motors must be small in size because of space limitations, but must nevertheless convey a substantial torque that is often required to drive the loads.

The epicyclic gear system 12 of the invention is driven by a small-size DC motor 10 that weighs about six ounces, is about 1.250 inches in diameter and 2.562 inches long. The epicyclic gear system 12 weighs about three ounces and is smaller in size and mass than the motor 10, as seen in FIG. 1. Thus, it is preferable to fix the motor 10 to a base 16 or platform and allow the gear system 12 to radially move a small amount to accommodate the inconsistencies in the concentricity of the gears, and the like. When the ring gear 46 is allowed to move radially with respect to the planet gears 26 and 32, the runout errors that resulted in non-concentric gears will allow the planet gears 26 and 32 to move radially a small amount with respect to the ring gear 46 and reduce binding therebetween. With the ability of the gear reducer body 40 to move radially with respect to the cap 18, the precision by which the gears are machined can be reduced.

The motor sun gear 11, the planet carrier sun gear, and the planet gears 26 and 32 are machined of a high grade stainless steel with tolerances from about 0.001 inch to about 0.002 inch. The diameter of the planet gears 26 and 32 are in the range of about 0.320 to about 0.370 inches. Each planet gear 26 and 32 is machined with a diametral pitch of 64. The lash tolerance of the sun gear 11, the planet carrier sun gear, and the planet gears 26 and 32 is between about +0.0 and –0.0005 inches. The teeth of the ring gear 46 are machined within the gear reduction body 40 with tolerances comprising a fraction of a tenth of a thousandth of an inch. The diameter of the ring gear 40 is between about 0.9700 inch and 0.9703 inch. In order for the gear reduction body 40 can freely move axially with respect to the cap 18, the castellation tab snap ring grooves 22 and 44 are made about 0.002 inch larger than the width of the snap ring 48 itself. A small degree of axial movement can thus be purposefully permitted between the cap 18 and the gear reduction body 40, although a certain degree of axial movement between the housings is not necessary to the practice of the principles of the invention.

Figure 3:
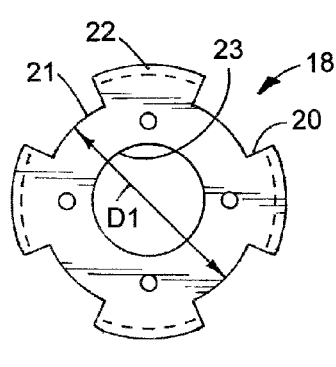
FIG. 3 is a front view of the cap of the DC motor constructed according to the invention.
Figure 4:
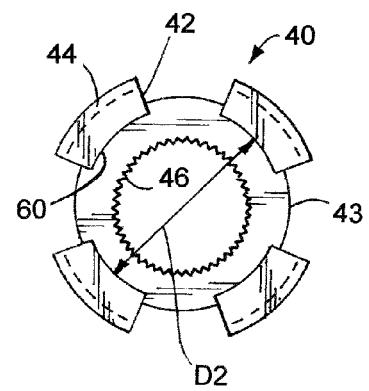
FIG. 4 is a front view of the gear reducer body constructed according to the invention.

The castellated mating edges of the cap 18 and the gear reduction body 40 are illustrated in respective FIGS. 3 and 4. As described above, the cap 18 is constructed of plural castellation tabs, one shown as numeral 20. A castellation valley 21 is formed between each castellation tab 20. A ring groove 22 is formed in the peripheral edge of each castellation tab 20. The body of the cap 18 is constructed with a diameter $D_1$ which is about 0.996 inches. The dimension D1 is also the diametric distance between opposite castellation valleys 21. The diameter $D_1$ between the valley surfaces forms the surface on which the inner arcuate edges 60 of the castellation tabs 42 of the gear reduction body 40 rest when the two components are assembled together. The inner diameter between opposite inner arcuate castellation edges 60 of the gear reducer body 40 is identified as $D_2$. In the preferred embodiment, the diameter $D_1$ is purposefully made smaller than the diameter $D_2$ so that there is some intentional radial play permitted between the two components 18 and 40. Preferably, the difference between $D_1$ and $D_2$ is on the order of 0.002 inch, and preferably in the range between about 0.001 and 0.003 inches. In other words, $D_2-D_1=0.002$ inch, preferably.

With the ability of the gear reduction body 40 to move radially in any direction with respect to the cap 18 when the meshing gears become excessively engaged, the interference therebetween is reduced, thus permitting a smooth roll between the planet gears 26 and 32, and the ring gear 46. Stated another way, when the split retaining ring 48 is seated in the annular groove of the castellation tabs 20 and 42, the gear reduction body 40 floats so that it can move radially a small amount in any arcuate direction between zero and 360 degrees. By reducing the binding between the gears of the epicyclic gear system 12, the precision by which the gears are machined is reduced, the motor 10 runs more freely with less friction, operates at a higher RPM, yields more mass inertia, and produces more torque. In addition, by reducing the binding between the gears due to errors in the concentricity thereof, the motor 10 operates with less amperage, lower operating temperatures which thus extends the service life thereof.

When the epicyclic gear system is constructed with small size gears, and the ring gear is able to float with respect to other gears of the system, the load is more evenly distributed to each of the planet gears. Although the gears of the epicyclic gear system are machined or otherwise formed within specified manufacturing tolerances, the minute differences in the pitch diameter of, for example the planet gears, can lead to situations where one planet gear is meshed more in the ring gear than other planet gears, whereupon the more meshed planet gear would bear more of the load than the other planet gears. When the load driven by the system is more evenly distributed amongst the gears due to the ability of the ring gear to float, the shock and vibration of the load is more evenly borne by the various gears and is not suddenly exerted on one or a few of the gears. The epicyclic gear system can thus withstand shock and vibration without breaking or stressing the gears. It can be appreciated that when the epicyclic gear system is employed in a reinstatement cutting machine, the cutting bit driven by the epicyclic gear system often encounters materials of different hardness. When proceeding from a plastic liner to the metal material of a main drainage pipe, for example, a vastly different load is presented to the bit and thus to the gears of the system. The abrupt difference in the load to the epicyclic gear system can represent a shock or impact which could otherwise damage the gears if of sufficient magnitude. When first bringing the rotating bit into contact with a material, there is a sudden impact load on the gears which must be absorbed. With the ability of the ring gear to float, the changes in the load are more evenly absorbed by the gears of the epicyclic gear system, thereby substantially enhancing the life of the system.

According to the preferred embodiment, the DC motor 10 is driven with a voltage to produce an output of about 6,000 to 6,600 RPM under load to maintain inertia and torque. With a compound epicyclic gear reduction system 12, the RPM of the output shaft 38 is less than about 100 RPM. The compound gear reduction system 12 can be constructed to provide reduction ratios on the order of 2,300:1, 1,500:1 and so on. With a reduction in the RPM of the gear reduction system 12, it can move radially with sufficient response to reduce binding between gears. When the mass of the gear reduction system 12 is less than that of the motor 10, then it is preferable to fix the motor 10 against movement, and mount the gear reducer body 40 to allow radial movement. Conversely, when the mass of the motor 10 is less than that of the gear reduction system 12, then it is preferable to fix the gear reduction body 40 against movement, and mount the motor 10 to allow radial movement thereof. One or both of the motor or the epicyclic gear reduction system could be mounted using resilient mounting members.

Another technique to allow the gears to move radially somewhat to relieve any tolerance interference between the gears could be to resiliently mount the various gear bearings in the respective frame members. This could be accomplished by forming a thin elastomeric band around the bearings, and then mount the bearings in an opening of the frame member. The bearing would give somewhat during interference between the gears, thus allowing a smooth roll between the gears.

While the preferred and other embodiments of the invention have been disclosed with reference to specific epicyclic gear components, and associated methods of fabrication thereof, it is to be understood that many changes in detail may be made as a matter of engineering choices without departing from the spirit and scope of the invention, as defined by the appended claims.

What is claimed is:

1. A method of manufacturing an epicyclic gear system, comprising: fabricating a two-part housing including a cap and a gear reducer body; forming male and female members around an annular edge of said cap; forming male and female members around an annular edge of said gear reducer body; forming said cap and said gear reducer body so that the male and female members of said cap mate with the respective female and male members of said gear reducer body; forming a ring gear to operate within said gear reducer body;

arranging gears within said two-part housing, at least some of the gears meshing with the ring gear of said gear reducer body;

forming the male and female members in one of said cap or said gear reducer body so as to allow relative radial movement therebetween when the male and female members of said cap are interleaved with the female and male members of said gear reducer body to reduce binding of the gears;

forming an annular groove in an outer arcuate edge of each male member of said cap and in an outer arcuate edge of each male member of said gear reducer body;

using an annular snap ring for engagement into the annular grooves of the male members of said cap and into the annular grooves of the male members of said gear reducer body to movably fasten said gear reducer body to said cap to form an integral epicyclic gear system.

2. The epicyclic gear system of claim 1, further including purposefully allowing said cap and said gear reducer body to move radially with respect to each other by about 0.001 inch to about 0.005 inch.

3. The epicyclic gear system of claim 1, further including forming the engagement between the male and female members of said cap and the female and male members of said gear reducer body so that said gear reducer body can move radially with respect to said cap.

4. The epicyclic gear system of claim 1, further including attaching a motor to the epicyclic gear system, and fixing the motor to a mounting structure and allowing at least a part of the epicyclic gear system to move radially with respect to the motor during operation.

5. The epicyclic gear system of claim 1, further including attaching a motor to the epicyclic gear system, and fixing the epicyclic gear system to a mounting structure and allowing the motor to move radially with respect to the epicyclic gear system during operation.

6. The epicyclic gear system of claim 1, further including allowing said gear reducer body to move radially and axially with respect to said cap.

7. The epicyclic gear system of claim 1, wherein said ring gear comprises teeth formed annularly around an inner surface of said gear reducer body.

8. The epicyclic gear system of claim 1, wherein the width of the ring groove is larger than the width of the snap ring to allow axial movement therebetween.

9. The epicyclic gear system of claim 1, wherein said cap and said gear reducer body are mounted together so that said gear reducer body is allowed to move radially a desired amount with respect to said cap to reduce binding of out-of-round gears of said epicyclic gear system.

10. The epicyclic gear system of claim 1, further including forming the male and female members of said cap as respective male castellation tabs and female castellation valleys, and forming the male and female members of said gear reducer body as respective male castellation tabs and female castellation valleys.

11. The epicyclic gear system of claim 10, further including:

forming the castellations of said gear reducer body with a given inside diameter D2 between opposite castellations thereof; and forming said cap with valleys between the castellations thereof, where the diameter D1 between opposite valleys of said cap is made purposefully less than the diameter D2 between the opposite castellations of said gear reducer body, whereby when the castellations of said cap and said gear reducer body are interengaged together, radial movement of a desired amount is permitted between said cap and said gear reducer body to reduce gear interference and provide a smooth roll between the gears.

12. A method of manufacturing a gear system, comprising: using a cap and a gear reduction body to mount a gear system therein; rigidly mounting the cap to a motor so that a shaft of said motor drives the gear system; forming castellation tabs and castellation valleys around said cap; forming castellation tabs and castellation valleys on an end of said gear reduction body, and extending the casetellation tabs of said gear reducer body axially beyond the end of said gear reducer body so that the castellation tabs of said gear reducer body fit within the castellation valleys of said cap; and forming an inner arcuate part of each castellation tab of said gear reducer body for engaging with an outer arcuate part of a respective castellation valley of said cap, and forming said engagement between the inner arcuate part and the outer arcuate part with a desired amount of play to allow said gear reducer body to move radially with respect to said cap and thus reduce binding between the gears of said gear system and mounting said gear reduction body to said cap using a snap ring inserted into grooves formed in the castellation tabs of said cap and said gear reduction body.

13. The method of manufacturing a gear system, comprising: using a first housing and a second housing to mount a gear system therein; extending an output shaft of said gear system from said second housing;

rigidly mounting the first housing to a motor so that a shaft of said motor drives the gear system; and mounting said second housing to said first housing mating castellations with ring grooves therein, and using a snap ring located in said ring grooves to hold the mating castellations together so that said second housing moves radially with respect to said first housing in an amount sufficient to remove binding of gears comprising said gear system.

14. The method of claim 13, further including forming gear teeth in said second housing so that said second housing comprises a ring gear.

15. The method of claim 14, further including assembling an epicyclic gear system in said second housing, and attaching a sun gear to said motor shaft, and mounting said second housing and epicyclic gear system to said motor so that the sun gear engages planetary gears of said epicyclic gear system.

16. The method of claim 15, further including allowing the ring gear to float so that loads are more evenly distributed on the planetary gears.

\* \* \* \* \*